(12) United States Patent
Huang

(10) Patent No.: US 6,868,295 B2
(45) Date of Patent: Mar. 15, 2005

(54) INTELLIGENT HOME CONTROL BUS

(76) Inventor: Geng Huang, Room 1811, Technology Park, 18 On Lai Street, Shatin New Territories (HK)

( * ) Notice: Subject to any disclaimer, the term of this patent is extended or adjusted under 35 U.S.C. 154(b) by 525 days.

(21) Appl. No.: 09/794,684

(22) Filed: Feb. 27, 2001

(65) Prior Publication Data

US 2001/0049761 A1 Dec. 6, 2001

(30) Foreign Application Priority Data

Feb. 28, 2000 (CN) .......................................... 00103067

(51) Int. Cl.[7] .............................................. G06F 17/00
(52) U.S. Cl. ........................... 700/90; 700/83; 700/275; 700/340; 700/3.1
(58) Field of Search .............................. 700/40, 90, 83, 700/275, 295; 340/3.1; 307/11

(56) References Cited

U.S. PATENT DOCUMENTS

| 4,665,544 A | | 5/1987 | Honda et al. |
| 4,918,690 A | * | 4/1990 | Markkula et al. ........... 370/400 |
| 5,086,385 A | | 2/1992 | Launey et al. |
| 5,544,036 A | | 8/1996 | Brown, Jr. et al. |
| 5,572,438 A | | 11/1996 | Ehlers et al. |
| 5,602,850 A | * | 2/1997 | Wilkinson et al. .......... 370/402 |
| 5,621,662 A | | 4/1997 | Humphries et al. |
| 5,761,083 A | | 6/1998 | Brown, Jr. et al. |
| 5,793,125 A | | 8/1998 | Tarng |

* cited by examiner

Primary Examiner—Jayprakash N. Gandhi
(74) Attorney, Agent, or Firm—Dicke, Billig & Czaja, PLLC

(57) ABSTRACT

This invention is an intelligent home control bus (IHbus). It comprises at least one input node (sensor, announcer) A and at least a output node (operator, listener) L. A control instructions are input from the input node A, and transferred to the output node L through a control bus, and the output node L outputs a logic operation result based on the instructions. The node A is a control device for transmitting data and has at least one input circuit for inputting a special logical state. The node L is a device for receiving data and performing a operation and has at least one output circuit for outputting a special logical state.

17 Claims, 5 Drawing Sheets

INTELLIGENT HOME CONTROL BUS

BACKGROUND OF THE INVENTION

1. Field of the Invention

This invention relates a home control bus, especially an intelligent home control bus for users.

2. Description of Related Art

Recently, the home automation (HA) are developing and becoming the more popularity. Some famous HA standards of Europe and United States, such as LonWorks, CEBus and X-10, have been employed widely in the HA field, and some of them have become factual HA standards in the China. Meanwhile, many organizations and factories participate in this field actively, put forward constructive idea, and offer related products, so that the system integrate merchandisers and users have more choice making a flourish situation.

Recently, in a national important technical project of China, an intelligent home control bus referred as "Apbus" has been selected as an intelligent home control bus products.

Home automation technique had been becoming popular since 70's in United State in 70's, the X-10 is the most representative brand of home automation products in the time. Since then, Echelon and Electronic Industries Association (EIA) of United States launched their HA products to the market, namely, Lonworks and CEBus respectively, which later on merged to become the home networking standard protocol of HA defined by EIA. Although the communication media of these standards are not exactly the same, they all employ the concept of control network with a specific communication protocol. Using the well-defined protocol, resources such as data and commands could be shared among respective devices in the network system. Such a control network was widely accepted and employed due to its installation simplicity, operation flexibility and extension ease. So far, the sale of X-10 products has exceeded 100 million in number, 4 million families are now enjoying the convenience and comfort brought by HA system. Besides X-10, LonWorks is now also extensively engaged in Home automation, building automation (BA) as well as Industrial Automation (IA). Up to 1998, over 5 million nodes installed LonWorks are being used worldwide.

However, the application of X-10 Home Automation system is rarely used in some countries such as China. The reason is that X-10 Home Automation system is not suitability to these countries. Mostly, X-10 HA system is used in the rebuild of old houses in United States. The same problem would be considered when people decorate new house or old house. The shape of X-10 products, most of the time, may not match consistently with the traditional wall-mounted sockets on which the X-10 components have to be plugged. Furthermore, the performance of X-10 may, somehow, disappoint users. For example, its respond-time is relatively long (0.883 sec for sending a command in a 60 Hz power supply system) and its ability of anti interference signal is poor. These drawbacks hinder the market acceptance to the products in China.

These problems also exist in the United States. To deal with the technical incapability of X-10, EIA engaged in the development of new Home Networking Standard that was launched to market in 1992, namely, CEBus (Consumer Electronic Bus), forming a standard called IS-60/EIA-600. Hundreds of enterprise participates in this research and development, such as Microsoft, IBM, Compaq Computer Corp, AT&T, Bell Labs, Honeywell, Panasonic, Sony, Thomson Consumer Electronics, Leviton, Pacific Gas & Electric etc. CEBus is a relatively complete open-system, which defines almost all the transmission standard of signal in the transmission medium. CEBus requires control signals (data) to be transmitted at the same rate (10 KBPS) in all the media so that any electronic products meeting the CEBus standard could communicate directly and in a two-way manner. The addressing capability is outstanding comparable to Internet. The anti-interference ability and control function is much better than that of the X-10, which makes CEBus become the "Biggest Challenger" to the X-10. However, the interface of CEBus is relatively complicated and the cost is rather high. Thus, CEBus shares a smaller market, especially.

On the contrary, LonWorks is more widely known in some application fields in China, and attracts the attention of experts and research institutes. LonWorks also gains a high score in terms of application, especially in the data collection and the data process control. LonWorks is an open intelligent control network technology invested by Echelon in United States. The research and development works was finished in December 1990, involving almost 700 staffs. Mike Markkula, the founder of Echelon, is also one of the founders in Apple Computer. The basic component is the Neuron chip, which possesses communication and control function. Inside the Neuron chip, there are three 8-bit microprocessors. In July 1997, Echelon empowers LonWorks protocol to be implemented in other authorized CPUs, and accredit Adept System to develop relevant software employed in Motorola 32 bit microprocessor (Motorola 68340). In August of the same year, LonWorks is entitled by Integrated Home System Technical Committee of EIA the standard of Home Networking, with model number EIA/IS-709.

Although LonWorks gains the honors of a home networking standard granted by EIA, it mainly enjoys the popularity in BA market of China, but not in HA. The major reason is obviously its price, which cannot be easily afforded by most families in developing countries. LonWorks is well known of its open in nature, flexibility and interoperability, where a node with a LonMark trademark can be interoperated. To achieve these, systems have to be divided into different small parts, so as to increase the types of variety of controllers, to simplify and to fix the operation flow. Such a practice, however, increases the number of nodes and thereby raises the cost of the system. Indeed, the most fundamental operation for HA is the control of power supply to electrical appliances and the simplest approach is to use controllable socket. However, the LonMark Socket manufactured by Leviton in United States, in which a Neuron chip and Neuron transceiver are contained, is surprisingly expensive for most families.

As a consequence, some developers and manufacturers of LonWorks products in China has started to search the space of system integration, e.g. to extend the use of Neuron or to employ an ordinary processor as the controller and Neuron as the communication component, developing a so-called multi-function control box. Such approaches could certainly cut the cost and enrich the function, but the products would no longer be mutually interoperable. The system loses its flexibility of being a distributive system. Instead, it is just a centralized or semi-centralized control system.

The above home control bus have their different characteristics, but none of them can be accepted by common families in developing countries, and the seldom products in the market prevent them to choose, which influenced more or less the technical popularization and application of HA in developing countries.

SUMMARY OF THE INVENTION

An object of the invention is to provide an intelligent home control bus having features of installation simplicity, low cost and operation flexibility.

According an aspect of the invention, an intelligent home control bus having at least one input node (sensor, announcer) A and at least a output node (operator, listener) L, wherein the control instructions are input from the input node A, and transferred to the output node L through a control bus, and the output node L outputs a logic operation result based on the instructions; the network has the following features:

1). the node A being a control device for transmitting data, node A having at least one input circuit for inputting a special logical state, and node A having at least one event data packet, wherein the node A transmits the event data packet to the bus when the state of the input circuit is varied;

2). the node L being a device for receiving data and performing a operation, the node L having at least one output circuit for outputting a special logical state, the node L having at least one read-write memory for storing data generated in the programming process;

3). After received the event data packet transmitted from the node A through the bus, the node L compares it with the data packet stored in the memory, and determines the output logical state according to the result of the comparing.

Preferably, the data packets of the node A had been stored in a nonvolatile memory of the node A in advance, that is, a programming is impossible at the node A.

The node L further comprise a programming button for making the node L into a programming state, that is, a programming is possible at the node L.

The logical relationship between the node A and the node L is formed based on the programming of the user to the node L without any relationship with the signification of the data (packet) from the node A.

The read-write memory of the node L is the data memory contained in the processor of the node L or corresponding nonvolatile memories.

The node L further comprises at least one LED for showing the work state of the node L or for at least showing whether the node L enter the programming state or not.

The nonvolatile memory of the node A is the read-only memory contained in CPU or MPU of the node A.

The programming state is a state where the node L waits for the event data (packet) from node A and the data of any corresponding operational instruction, which are acceptable and explainable by the node L, from the programming device.

The event data (packet) from the node A, the corresponding operational instruction from programming device and so on, all of them will be stored into said read-write memory as data after programming.

The node A transmits the data packet to the bus using an encoding method that is similar to that of Manchester's code; the encoding method means that binary number 1 is made from one pulse (no matter with the direction of the pulse ), and binary number 0 is made from two reversed pulses which are same width.

The pulse wave period of the binary number 1 is equal to the sum of two pulses wave periods of the binary number 0, that is, the binary numbers 1 and 0 have the same transmit time (100 $\mu$s) and the same speed (10 Kbps).

The respective kinds of event data (packet) have the same length, i.e., 10 bytes, the first byte is data sort code, the second to ninth byte contains node ID code, and the tenth byte is the check sum of the total data (packet).

BRIEF DESCRIPTION OF THE DRAWINGS

Additional objects and advantages of the present invention will be more readily apparent from the following detailed description of preferred embodiments when taken together with the accompany drawings, in which.

DETAILED DESCRIPTION OF THE PRESENTLY PREFERRED EMBODIMENTS

Figure 1:
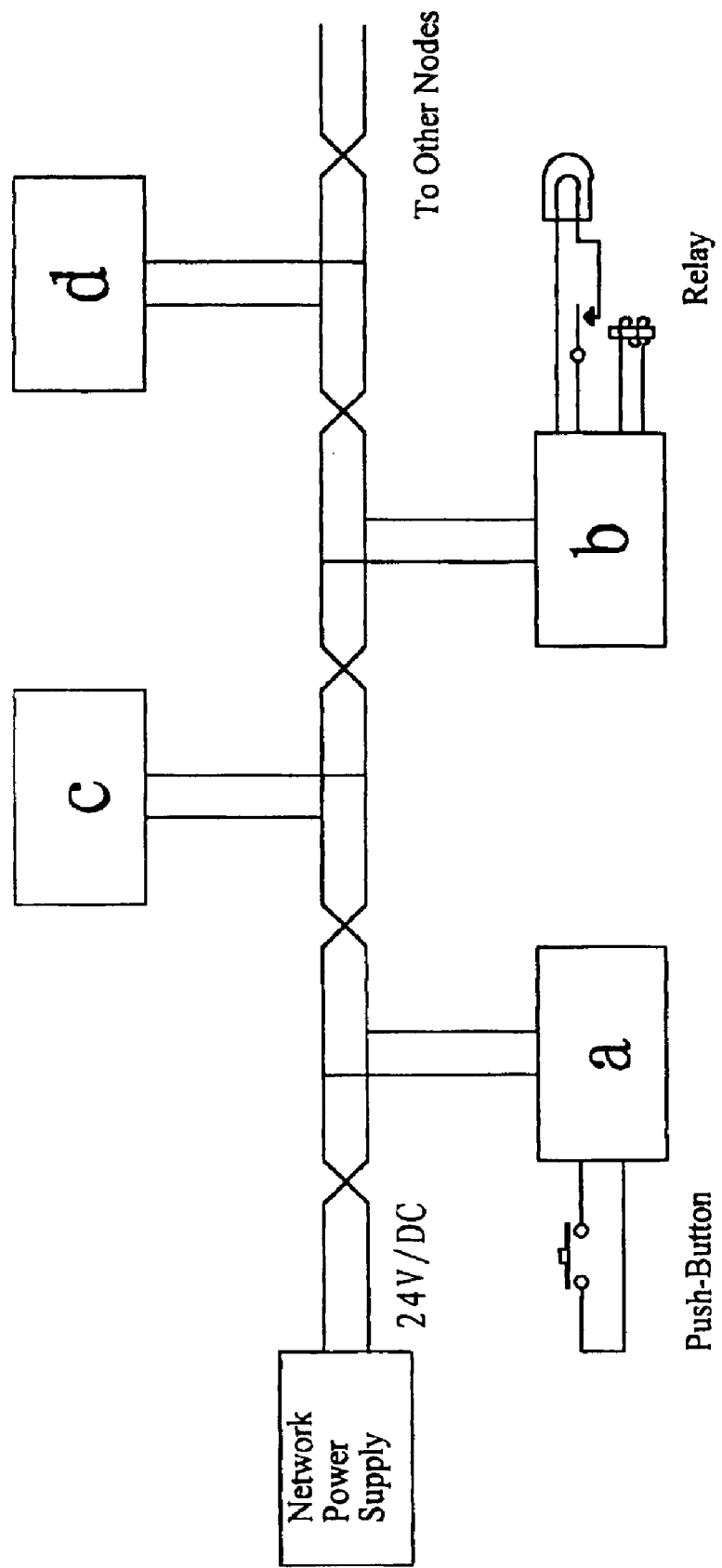
FIG. 1 is a schematic diagram showing the configuration of an embodiment according the invention.

The intelligent home control bus according the invention is similar to Lonworks, is a fully distributive fully distributive intelligent control network yet. The products are capable of bi-directional communication and possessed of the nature of interoperability. The control modules are programmable to meet different desires of users. Typical intelligent home control Bus employs twisted pair as the bus. Each node on the network obtains power supply (24V/DC) from the bus. Through the bus, polarity insensitive, free topology wiring and communication can be achieved among the nodes. The signal encoding method of ApBus is similar to that of LonWorks (Manchester-like); the signal transfer speed and system capacity is the same as that of CEBus, which is 10 KBPS and 4 G respectively. A block diagram illustrating a typical application of ApBus is shown in FIG. 1.

Figure 2:
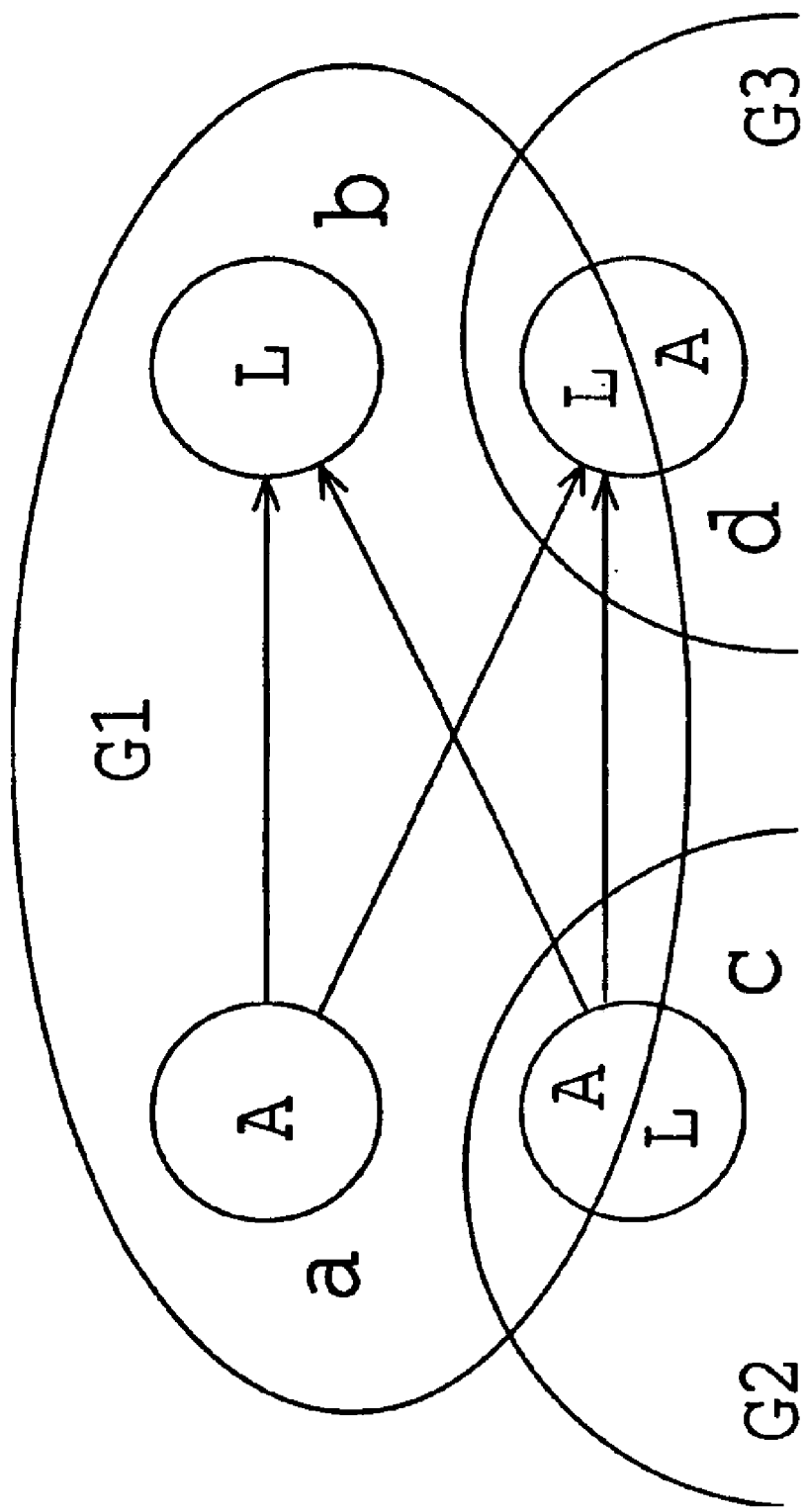
FIG. 2 is a logical diagram showing the configuration of a conventionality system.

Before describing the technical features of Intelligent home control bus according the invention, let us take a look of some conventional control systems. First, we focus on LonWorks. FIG. 2 shows a block diagram illustrating the logical relationship among LonWorks nodes. As shown in FIG. 2, nodes are classified into two main groups: Listener and Announcer. The letter "a" represents an Announcer, "b" represents a Listener, "e" and "d" represents either a Listener or an Announcer. The address encoding of LonWorks is rather complicated, involving physical address (Neuron-ID), logical address (Domain, Subnet, Group), source address and destination address. It is assume that "a" is a push-button module (sensor), "b" is a relay modules (actuator). When "a" is pressed, "b" will operate. According to the LonTalk protocol, "a" will transmit an instruction which contains the destination address of "b" and pre-defined instruction to instruct "b" executing the instruction.

In this example, "a" is Announcer, playing an active role; "b" is Listener, being the passive part. "b" executes the instruction from "a", and "a" has to send multiple commands to "b" in order to take multiple actions. Similarly, if "a" has to control more nodes, it has to send even more commands, each for different nodes. Therefore, system function is programmed with "a" as the focus.

Figure 3:
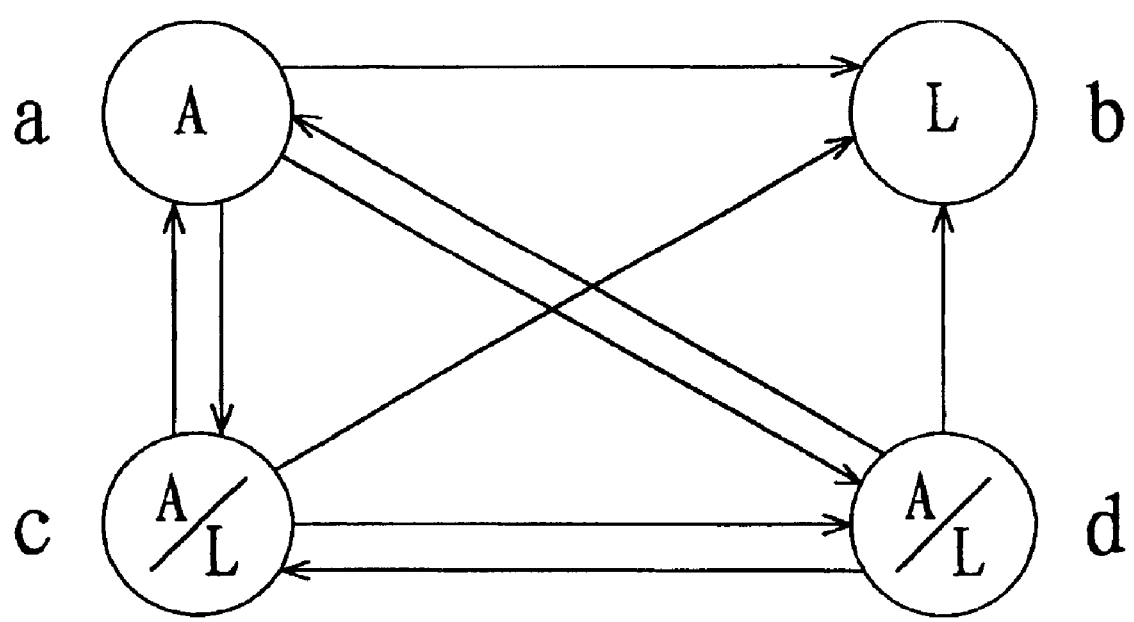
FIG. 3 is a logical diagram showing the configuration of an embodiment according the invention.

FIG. 3 shows the logical relationship among intelligent home control bus nodes (IHbus). Obviously, IHbus is simpler than LonWorks in the structure. To facilitate a description for the invention, nodes are also classified into Listener (node A) and Announcer(node L). Since the system do not have defined a destination address, data would be transferred to every nodes. Also, as there is not grouping, the system do not need the logical address defined by users. Instead, nodes are identified by Node ID, which is assigned during manufacturing. Assume that "a" (node A) is a push-button module (Announcer), "b", "c" and "d" are relay modules (Listener). When "a" is pressed, "a" send a data packet with the Node ID of "a". Then, "b", "c", "d" and other nodes of the network receive the data packet and operate synchronously.

For a data packet to make multiple nodes operate in different ways, the usual practice is to state in the data packet all the addresses of nodes and all the command to be executed. However, such an approach would not be applied in this invention. Otherwise, IHbus would lose its advantageous features. In this system, data packet transmitted from "a" is fixed. It is not really a command, but an event (e.g., the push-button of "a" is pressed). The responsibility of "a" is to transfer a unique code representing the event to the bus, through which the event is then transferred to all the nodes.

Then, how IHbus defines an event? Is it similar to CEBus or LonWorks that classify all event, controller and operation? No, Unlike CEBus and LonWorks, IHbust would not define an event by dividing it into small parts, as this increases the number of nodes involved and thus increases the cost of system and weaken the flexibility of the system. For overcoming this problem, IHbus had a historical test, would not define anything. Instead, it requires all the events to correspond with their own data packet. Also, for the sake of convenience, IHbus defines the data type and data length.

When event data packet is transmitted to the bus, how is it transferred to the nodes and how does the nodes understand the events and react correctly? How can the interoperability among nodes be achieved? All these are highly related to the system programming, but the principle is so simpler than what you think. All operating parts (Listener) of IHbus are intelligent devices, i.e., they have study and memory functions. During the programming course, the operating parts react the related event that means, the programming (study) course finished, and the operating parts can store the event and corresponding action generated during programming in the memory(EEPROM). The data will hold in the node more than 100 years even power supply broken. It is obvious that the most difference between Lonworks and present networks is that IHbus always operate a program for the Listener, not for the Announcer. Listeners will take actions after receive a word from Announcer. Obviously, IHbus is more intelligent and efficiency, which is named "intelligent" home control bus.

Comparing with Lonworks system, how about the capable of bi-directional communication and the nature of interoperability? Because all Listeners have study function, this problem can be solved easily. if any part be changed, just operating the related operate parts (Listeners) study again, they will know the new "partner", and know how to cooperate with it, "dissepiment(obstruct)" never exists between nodes of intelligent home control bus system.

For users, IHbus is featured of installation simplicity (operate freely), flexibility (intelligent function), enhanced effective (decided by the operator parts), interoperability (need study) and interchangeable (need study again). On the other hand, for achieving the above functions, IHbus must settle down more technical problems, such as mix transmit problem between signal and DC; polarity insensitive transmit problem, mix free topology wiring problem; priority of signals; no shield interfere and so on. All these problems are settled in Ihbus. Moreover, to deal with a common problem of such kind of system, i.e., the data collision problem during signal transmission, intelligent home control bus develops CSMA/CD access control method with suitable modifications, so as to achieve collision-free multi-nodes random data transmission. Such a technology raises the efficiency and reliability of the system and it is entitled CSMA/CF (Carrier Sense Multiple Access with Collision-Free).

We can see, from the above, intelligent is developed from existing HA systems with suitable modifications, so as to further simplifying and enhancing the effectiveness of the home control bus to meet the residential environment in developing countries and supplying HA for most families. The features of Ihbus products will be described as following.

Any products entitled the trademark "ApBus Compatible" are compatible with IHbus, implying their interoperability to one another. This registered trademark is owned by Actpro Int'l (HK) Ltd. As the interface of intelligent home control bus is rather simple, it can be employed to traditional electrical appliances, such as a lighting switch and a socket. Recently, intelligent home control bus has developed a series of switches and sockets with built-in intelligence. An intelligent switch could control several lighting and electrical appliances; in the other way round, a lighting or electrical appliance can be controlled by different switches in different location of your house. Also, such a kind of switch and socket can be controlled by different means, such as a telephone control, a remote control, a computer control, etc. ApBus is characterized by its flexibility and cost effectiveness, making itself extremely affordable for most families.

So far, Ihbus products available in the market could be classified into five groups according to their main functions:

1. Basic Control Products—This includes Network Power Supply, telephone remote/alarm interfaces, Universal RF Receiver and Security System Control interfaces, forming the basic structure of IHbus and providing a connection platform for other intelligent home control bus products. Users installing this basic portion of IHbus could upgrade the system later on according to the budget.
2. Lighting Control Products—The main lighting control product is Intelligent Lighting Switch/Dimmer. The dimensions are similar to that of the traditional lighting switch. It allows users to bright up or dim down the lighting and the lighting can also be remotely controlled, to suit different living environment. If, unfortunately, one of the intelligent switches is out of order, the rest of the system will not be affected. Also, a traditional lighting switch can replace that intelligent switch if the intelligent switch is temporarily out of stock.
3. Electric Appliance Control Products—The Control Socket mentioned above is an example of electric appliance control products. Similar to the lighting control products, Appliance control products can achieve intelligent control by changing the original socket. Put the appliances such as electric cooker, water heater, air-condition, and washing machine in the socket, the user can control them by an electric switch, a remote controller or a telephone, conveniently. The controllable socket can be affected automatically and manually. Also that manual switch can replace the intelligent switch if the intelligent switch is temporarily out of stock.

4. Security Control Products—This includes Motion Detector, Combustible Gas Detector, Smoke Detector and Siren. The installation of these products is comparatively simple (direct connect to the bus). Because of compatible symbol of IHbus, these products can connect the bus directly, also can give a remote alarm by a remote telephone/alarm interface in the system. Using the Security System Control interface of the system, sensors of other brands can also be used in IHbus system.

5. Other Control Products—This kind of products aims to achieve special functions, for instant, Universal Remote, which controls almost all the A/V equipments, lighting and appliances of your home. For another example, Universal Timer, which has 100 group timetables, schedules the tasks done by your home appliances. For example, in the morning, powering on light at 6:00, switching on T.V set at 6:10, cooking coffee at 6:20, and powering on stove at 6:30, which can be easily programmed by the users.

The birth of IHbus is a benefit development in the home automation field. At least user can have more choices in the field. Ihbus is a new thing, which need time to be known and used. With the development of economics, the enhanced living standard, it is not difficult to foresee that intelligent home control bus can have hundreds and millions users.

Figure 4:
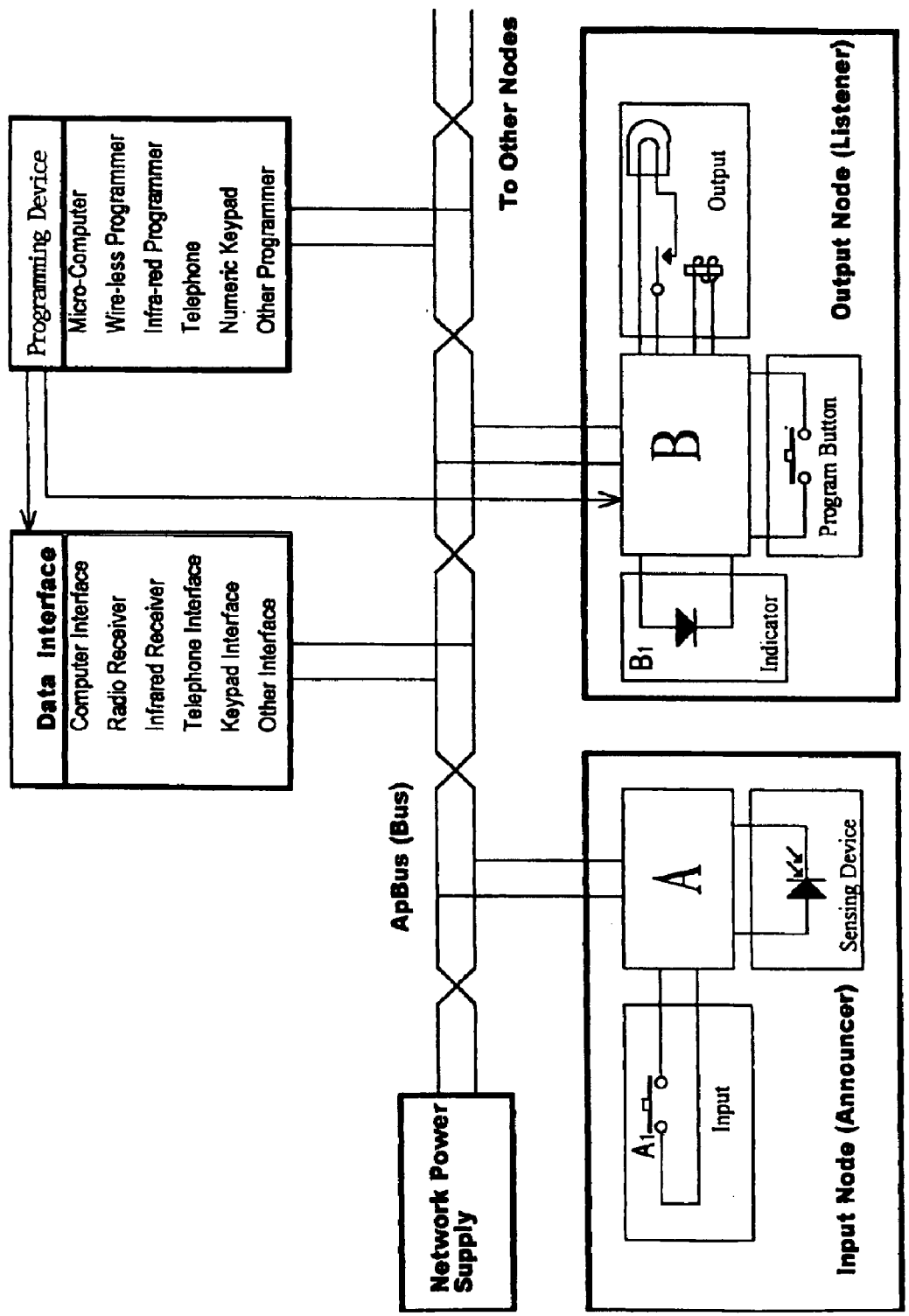
FIG. 4 is a schematic diagram showing the operation/programming principle of an embodiment according the invention.

The operation and programming course of the system according the invention will be described referring an embodiment shown in FIG. 4 as following:

In FIG. 4, Node A represents an announcer (that is sensor), which using a button to make a input circuit, which has two logical states (open and close), corresponding two events (press and release). Every event has a unique data packet (D1/D2), and the transmission of the data packet means the operated events. According to the definite of IHbus, announcer (node) A need not to program, data packets D1 and D2 had been set and stored in the nonvolatile memories in advance before announcer A leaves factory. See the table 1.

TABLE 1

The relationship of events and data packets in announcer (A) nodes

| Event | Data packet |
|---|---|
| Press the button A1 | D1 |
| Release the button A1 | D2 |

Let us have a look of another node L shown in the FIG. 4, the node L represents a listener (operator) and has an output circuit, it controls a light through a relay. Assume that the node A is a push-button module (Announcer), the node L is relay modules (Listener). When the button A1 of the node A is pressed, the relay of the node L pass on, the state light of node L powered on. When the button A1 of the node A is released, the relay of the node L shut down, the state light B1 of the node L powered off. To achieve the logical relationship, the node L must be programmed and stored Data packets D1 and D2 in the worksheet of the node L, and must designate the relationship between D1, D2 and light power on or off. Table 2 shows the relationship detail.

TABLE 2

The relationship between data packets and light operations in the node L

| Data package | Operation |
|---|---|
| D1 | Power on |
| D2 | Power off |

From this table, it is obvious that the data packet D1 and D2 only have the function for transmitting the event information in the system, they are insignificant and irrepetitive string. If ignoring the data packets, the logical operation system is presented as shown in the Table 3.

TABLE 3

The logical relationship of IHbus (from the node A to the node L)

| Announcer node A | Listener node L |
|---|---|
| Press button A1 | Power on |
| Release button A1 | Power off |

From the above analysis we could find data packet itself is not the most important in the system. On the contrary, the most important is how nod A (announcer) can put an event data packet into the worksheet of the node L (listener) in the programming system and designate the relationship between these data packets and the action executed by L. In order to achieve the object, a programming button (or other input device) is provided at every Listener node in the IHbus. When pressing the programming button (or the device is touched off) of the node L, the node L turn into programming state. If the node A takes place event (press or release the button), the corresponding data packets (D1 and D2) are transmitted to the node L through the bus. And the programming node L will store these data packet into itself worksheet (RAM, EEPROM or FLASH-FOM and so on read-write memories), and wait for receiving the operation instruction related with the data packet (event). These related operation instruction would be transmitted to the node L through the following two ways: one way is transmitting the instruction to the node L through the bus; another is connecting the node L directly. Any way, the device transmitting operation instruction is called "programming device" or "programmer".

Figure 5:
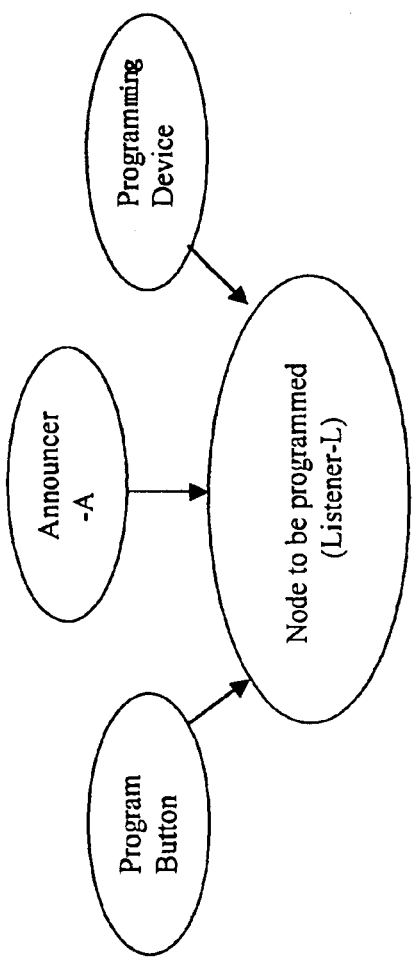
FIG. 5 is a logical diagram showing the programming principle of the invention.

If programming through the bus, it must connect to the bus with a data interface. The data interface is a data bridge for connecting a programming device to a pending program node L. if program the node L directly, the node L also has a data way connected with programming device that are computer, phone, data-keypad or other input device. The data transmitted by them are called "operation instructions", and these instructions are accepted and explained a series actions by the pending programming node L, such as open/close, up/down, increase/decrease, fast/slow, loop choice, data store or abandon and so on. In a word, the node L must receive the data from programming device, and employ a common language with the programming device. The object of programming is that input related operation data following event data in pending programming worksheet. Corresponding logical diagram is shown in FIG. 5.

First, a program instruction is sent by the programming button, the pending program node accepts event data, then programming device sends operation instruction to finish the whole program process. This is a programming way of the intelligent home bus. But in fact the order of above operations could be randomly arranged. If only the three steps are presented, and the relationship between the cause (event) and the result (operation) can be settled, then the programming could be implemented.

Similar, programming instruction could be generated by programming button, and other input devices could be used such as a switch, and an infrared remote, etc. Furthermore, the programming instruction can be put into the programming device, and enable the programming node through the bus or other data transmit way. In this case, the pending programming device must be able to explain this instruction. If it is enabled through the bus, the programming instruction must contain a pending program node's ID code, so as to confirm which node L should accept the program (if there are a plurality of nodes L in the system).

From above description, the current data in bus contain significant data packet besides insignificant event data packet, i.e. programming instruction data packet (table 15) and operation data packet (table 13) and so on.

In fact, the data packets are classified in the intelligent home control bus as the Table 4.

TABLE 4

General event data packet form (sort.0)

| Sort of data packet code | System holds byte | Node ID code | User defined field | Data flow control word | Check sum |
|---|---|---|---|---|---|
| 0000-1111/ 'OF' H | 0000-0000/ '0' H | 8 × 6 = 48 bit | 8 × 0 = 0 bit | 8 bit | 8 bit |

TABLE 5

General event data packet form (sort.1)

| Sort of data packet code | System holds byte | Node ID code | User defined field | Data flow control word | Check sum |
|---|---|---|---|---|---|
| 0001-1110/ '1E' H | 0000-0000/ '0' H | 8 × 5 = 40 bit | 8 × 1 = 8 bit | 8 bit | 8 bit |

TABLE 6

General event data packet form (sort.2)

| Sort of data packet code | System holds byte | Node ID code | User defined field | Data flow control word | Check sum |
|---|---|---|---|---|---|
| 0010-1101/ '2D' H | 0000-0000/ '0' H | 8 × 4 = 32 bit | 8 × 2 = 16 bit | 8 bit | 8 bit |

TABLE 7

General event data packet form (sort.3)

| Sort of data packet code | System holds byte | Node ID code | User defined field | Data flow control word | Check sum |
|---|---|---|---|---|---|
| 0011-1100/ '3C' H | 0000-0000/ '0' H | 8 × 3 = 24 bit | 8 × 3 = 24 bit | 8 bit | 8 bit |

TABLE 8

General event data packet form (sort.4)

| Sort of data packet code | System holds byte | Node ID code | User defined field | Data flow control word | Check sum |
|---|---|---|---|---|---|
| 0100-1011/ '4B' H | 0000-0000/ '0' H | 8 × 2 = 16 bit | 8 × 4 = 32 bit | 8 bit | 8 bit |

TABLE 9

General event data packet form (sort.5)

| Sort of data packet code | System holds byte | Node ID code | User defined field | Data flow control word | Check sum |
|---|---|---|---|---|---|
| 0101-1010/ '5A' H | 0000-0000/ '0' H | 8 × 1 = 8 bit | 8 × 5 = 40 bit | 8 bit | 8 bit |

TABLE 10

General event data packet form (sort.6)

| Sort of data packet code | System holds byte | Node ID code | User defined field | Data flow control word | Check sum |
|---|---|---|---|---|---|
| 0110-1001/ '69' H | 0000-0000/'0' H | 8 × 0 = 0 bit | 8 × 6 = 48 bit | 8 bit | 8 bit |

TABLE 11

Special data packet form (time sort)

| Sort of data packet code | System holds byte | DATE Year/month/day | TIME Hour/minute/second | Data flow control word | Check sum |
|---|---|---|---|---|---|
| 0111-1000/ '78' H | 0000-0000/ '0' H | 8 × 3 = 24 bit | 8 × 3 = 24 bit | 8 bit | 8 bit |

TABLE 12

Special data packet form (function sort)

| Sort of data packet code | System holds byte | Function sort | Control instruction | Data flow control word | Check sum |
|---|---|---|---|---|---|
| 1000-0111/ '87' H | 8 × 5 = All '0' | 8 bit 40 Bits, | 8 bit | 8 bit | 8 bit |

TABLE 13

Special data packet form (operation instruction)

| Sort of data packet code | System holds byte | Operation instruction | Parameter | Data flow control word | Check sum |
|---|---|---|---|---|---|
| 1001-0110/ '96' H | 8 × 5 = 40 Bits, All '0' | 8 bit | 8 bit | 8 bit | 8 bit |

TABLE 14

Special data packet form (feedback)

| Sort of data packet code | System holds byte | Node ID code | User defined field | Data flow control word | Check sum |
|---|---|---|---|---|---|
| 1010-0101/ 'A5' H | 0000-0000/ '0' H | 8 × 4 = 32 bit | 8 × 2 = 16 bit | 8 bit | 8 bit |

TABLE 15

Special data packet form (programming instruction)

| Sort of data packet code | System holds byte | Node ID code | User defined field | Data flow control word | Check sum |
|---|---|---|---|---|---|
| 1011-0100/ 'B4' H | 0000-0000/ '0' H | 8 × 4 = 32 bit | 8 × 2 = 16 bit | 8 bit | 8 bit |

TABLE 16

Special data packet form (store)

| Sort of data packet code | System holds byte | Hold | Hold | Data flow control word | Check sum |
|---|---|---|---|---|---|
| 1100-0011/ 'C3' H | 0000-0000/ '0' H | 8 × 3 = 24 bit | 8 × 3 = 24 bit | 8 bit | 8 bit |

TABLE 17

User defined data packets form (users)

| Sort of data packet code | Data length | Node ID code | User defined field | Data flow control word | Check sum |
|---|---|---|---|---|---|
| 1111-0000/ 'F0' H | 8 bit | 8 × 4 = 32 bit | 8× (N-8) bit | 8 bit | 8 bit |

TABLE 18

Data packets form (sort 1)

| Sort of data packet code | Data form and subsystem sort | Node ID code | Data | Data flow control word | Check sum |
|---|---|---|---|---|---|
| 1110-0001/ 'E1' H | 00-B5B4B3-001 | 8 × 5 = 40 bit | 8 × 1 = 8 bit | 8 bit | 8 bit |

TABLE 19

Data packets form (sort 2)

| Sort of data packet code | Data form and subsystem sort | Node ID code | Data | Data flow control word | Check sum |
|---|---|---|---|---|---|
| 1110-0001/ 'E1' H | 00-B5B4B3-010 | 8 × 4 = 32 bit | 8 × 2 = 16 bit | 8 bit | 8 bit |

TABLE 20

Data packets form (sort 3)

| Sort of data packet code | Data form and subsystem sort | Node ID code | Data | Data flow control word | Check sum |
|---|---|---|---|---|---|
| 1110-0001/ 'E1' H | 00-B5B4B3-011 | 8 × 3 = 24 bit | 8 × 3 = 24 bit | 8 bit | 8 bit |

TABLE 21

Data packets form (sort 4)

| Sort of data packet code | Data form and subsystem sort | Node ID code | Data | Data flow control word | Check sum |
|---|---|---|---|---|---|
| 1110-0001/ 'E1' H | 00-B5B4B3-100 | 8 × 2 = 16 bit | 8 × 4 = 32 bit | 8 bit | 8 bit |

TABLE 22

Data packets form (sort 5)

| Sort of data packet code | Data form and subsystem sort | Node ID code | Data | Data flow control word | Check sum |
|---|---|---|---|---|---|
| 1110-0001/ 'El' H | 00-B5B4B3- 101 | 8 × 1 = 8 bit | 8 × 5 = 40 bit | 8 bit | 8 bit |

TABLE 23

Data packets form (sort 6)

| Sort of data packet code | Data form and subsystem sort | Node ID code | Data | Data flow control word | Check sum |
|---|---|---|---|---|---|
| 1110-0001/ 'E1' H | 00-B5B4B3- 110 | 8 × 0 = 0 bit | 8 × 6 = 48 bit | 8 bit | 8 bit |

Above table 4–10 are general event data packets from 0th–6th sort. Further, six kinds of special data packets are presented in table 11–16, other six kinds of data packets are presented in table 18–23, and a kind of user defined data packet is presented in table 17. The last three kinds of data packets have content or user defined data packets.

According the above illustration, all of other data packets are composed of 10 bytes except data defined by user, the first byte is the code of data packet's sort, the second is systemic hold bytes. The third to the eighth are node ID code or parameter or other functions, the ninth one is data current control bit, the last one (the $10^{th}$) is check sum.

Figure 6:
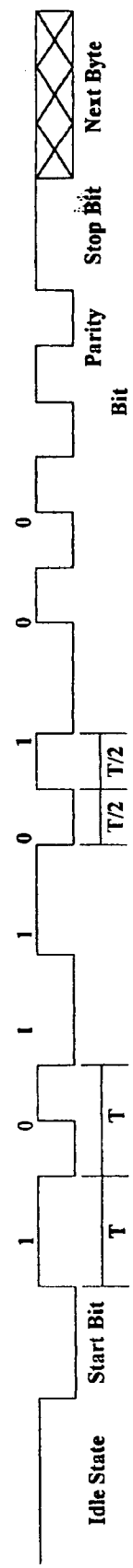
FIG. 6 is a diagram showing the waveform of the digital code pulse in the system according the invention.

Finally, the digital encoding mode of the Ihbus will be described, that is, how to compose a data according the waveform of the pulse. IHbus must use a Manchester-Like encoding mode. The pulse waveforms are shown in FIG. 6. As shown in FIG. 6, one byte of the IHbus is composed of eight data bits, a parity check and a Stop bit. And there is a initiate bit at the beginning of every data packet. The width (the length of time "T") of all bits are same. Binary number "1" is composed by the positive or reversed (negative) pulse wave, which time length (period) is one T. Binary number "0" is composed of two pulse waves, in which each having ½ T time length and reversed in polarity each other. The total length of said two pules is T.

TABLE 24 the parameter of digital code time of IHbus (demarcate value)

| Start bit/Stop bit | Binary Number '0' | Binary Number '1' |
|---|---|---|
| T (100 $\mu$s) | T/2 (50 $\mu$s) + T/2 (50 $\mu$s) | T (100 $\mu$s) |

Table.24 shows the demarcate value of digital code time data T, IHbus is 100 $\mu$s and can be composed of two 50 $\mu$s when binary number is "0". Since the time T is immovable, the data transmission rate is fixed, that is 10 KBps (10 k bits per second).

TABLE 25 the parameter of digital code time of IHbus (transmitter)

| Start bit/Stop bit | Binary Number '0' | Binary Number '1' |
|---|---|---|
| 90 $\mu$s =< Start bit/Stop bit <110 $\mu$s | 40 $\mu$s =< T/2 <60 $\mu$s | 90 $\mu$s =< T <110 $\mu$s |

Table.25 shows the time precision requirement while the transmitter of the IHbus transmits data. From the table, IHbus requires the error of every pulse wave is less than 10 $\mu$s whatever the binary number is "0" or "1".

TABLE 26 the parameter of digital code time of IHbus (receiver)

| Start bit/Stop bit | Binary Number '0' | Binary Number '1' |
|---|---|---|
| 75 $\mu$s =< Start bit/Stop bit <150 $\mu$s | 25 $\mu$s =< T/2 <75 $\mu$s | 75 $\mu$s =< T <150 $\mu$s |

Table.26 shows the permitted time length of each pulse wave while a receiver accepts the data. The permitted time length of each pulse wave on the receiver is much larger than that on the transmitter in Ihbus. It is almost 50% that the tolerable error rate on the receiver.

Figure 7:
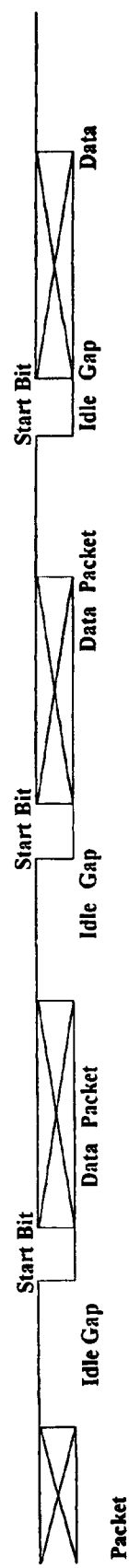
FIG. 7 is a timing chart showing a data packet used in the system according the invention.

FIG. 7 is the timing chart showing the order of data packets. A time slot is presented between data packets, and a negative pulse wave is provided as the initial pulse of data.

The above description is used for illustrating, but is not a limitation for present invention. The some changes and modifications are to be understood as being within the scope of the present invention as defined by the appended claims.

What is claimed is:

1. An intelligent home control network having a least one input node and at least one output node, wherein control instructions are input to the input node and transferred to the output node through a control bus, and the output node outputs a logic operation result based on the instructions, the intelligent home control network, comprising:

the input node being a control device for transmitting data, the input node having at least one input circuit for inputting an input logical state, and the input node having least one event data packet, and wherein the input node transmits the event packet to the control bus when the state of the input circuit is varied;

the output node being a device for receiving data and performing an operation, the output node having at least one output circuit for outputting an output logical state, the output node being responsive to a programming process and having at least one read-write memory for storing programmed data generated in the programming process; and after receiving the event data packet transmitted from the input node through the control bus, the output node compares the received data packet with the programmed data stored in the memory, and determines the output logical state according to the result of the comparing.

2. The intelligent home control network according to claim 1, wherein the event data packets of the input node have been stored in a nonvolatile memory of the input node in advance, such that programming is impossible at the input node.

3. The intelligent home control network according to claim 1, wherein the output node further comprises a programming button for placing the output node into a programming state, such that programming is possible at the output node.

4. The intelligent home control network according to claim 1, wherein the logical relationship between the input node and the output node is based on the programming process of the output node without any relationship with the significance of the event data packet from the input node.

5. The intelligent home control network according to claim 1, wherein said read-write memory of the output node is the data memory contained in a micro processor of the output node or corresponding nonvolatile memories.

6. The intelligent home control network according to claim 1, wherein the output node further comprises at least one LED for showing the output logic state of the output node.

7. The intelligent home control network according to claim 2, wherein the nonvolatile memory of the input node is read-only memory contained in a CPU of the input node.

8. The intelligent home control network according to claim 3, wherein the programming state is a state where the output node waits for the event data packet from the input node and the data of any corresponding operational instruction, which are acceptable and explainable by the output node, from a programming device.

9. The intelligent home control network according to claim 8, wherein the event data packet from the input node, and the corresponding operational instruction from programming device are stored into said read-write memory as data after programming.

10. The intelligent home control network according to claim 1, wherein the input node transmits the event data packet to the bus using an encoding method that is similar to that of LonWorks; the encoding method means that binary number 1 is made from one pulse (no matter with the direction of the pulse), and binary number 0 is made from two reversed pulses which are same width.

11. The intelligent home control network according to claim 10, wherein the pulse wave period of the binary number 1 is equal to the sum of two pulses wave periods of the binary number 0, that is, the binary numbers 1 and 0 have the same transmit time (100 µs) and the same speed (10 Kbps).

12. The intelligent home control network according to claim 10, wherein respective kinds of event data packet have the same length, that is, 10 bytes, the first byte is data sort code, the second to ninth byte contains node ID code, and the tenth byte is the check sum of the total data packet.

13. An intelligent home control network comprising:

an input node having an input circuit configured to receive input logic states and produce an event data packet related to the input logic states, wherein each input logic state relates to a single event data packet;

a control bus coupled to the input node, the control bus transmitting the event data packets;

an output node coupled to the control bus configured to receive the event data packets, the output node having an output memory and having an output circuit configured to produce output logic states causing output operations; and wherein the output node is programmable such that correlation is saved in the output memory between event data packets and output logic states, wherein each event data packet correlates with a single output logic state.

14. The intelligent home control network of claim 13, wherein each output logic state causes one unique output operation.

15. The intelligent home control network according to claim 13, wherein the event data packets of the input node have been stored in a nonvolatile memory of the input node in advance, such that programming is impossible at the input node.

16. The intelligent home control network according to claim 13, wherein the output node further comprises a programming button for placing the output node into a programming state, such that programming is possible at the output node.

17. The intelligent home control network according to claim 16, wherein the programming state is a state where the output node waits for the event data packet from the input node and the data of any corresponding operational instructions, which are acceptable and explainable by the output node from a programming device.

* * * * *

UNITED STATES PATENT AND TRADEMARK OFFICE
CERTIFICATE OF CORRECTION

PATENT NO. : 6,868,295 B2
APPLICATION NO. : 09/794684
DATED : March 15, 2005
INVENTOR(S) : Geng Huang It is certified that error appears in the above-identified patent and that said Letters Patent is hereby corrected as shown below:

Column 1, line 14, delete "the".

Column 1, line 24, delete "United State" and insert in place thereof --United States--.

Column 2, line 57, delete "e.g." and insert in place thereof --e.g.,--.

Column 3, line 10, delete "According" and insert in place thereof --According to--.

Column 3, line 18, delete "1)." and insert in place thereof --1.)--.

Column 3, line 23, delete "2)." and insert in place thereof --2.)--.

Column 3, line 28, delete "3)." and insert in place thereof --3.)--.

Column 3, line 28, delete "received" and insert in place thereof --receiving--.

Column 3, line 63, delete "pulse )," and insert in place thereof --pulse),--.

Column 4, line 15, delete "according the" and insert in place thereof --according to the--.

Column 4, line 19, delete "according the" and insert in place thereof --according to the--.

UNITED STATES PATENT AND TRADEMARK OFFICE
CERTIFICATE OF CORRECTION

PATENT NO. : 6,868,295 B2
APPLICATION NO. : 09/794684
DATED : March 15, 2005
INVENTOR(S) : Geng Huang It is certified that error appears in the above-identified patent and that said Letters Patent is hereby corrected as shown below:

Column 4, line 21, delete "according the" and insert in place thereof --according to the--.

Column 4, line 26, delete "according the" and insert in place thereof --according to the--.

Column 4, line 28, delete "according the" and insert in place thereof --according to the--.

Column 5, line 62, "delete "if any" and insert in place thereof --If any--.

Column 6, line 24, delete "Ihbus" and insert in place thereof --IHbus--.

Column 6, line 37, delete "location" and insert in place thereof --locations--.

Column 6, line 43, delete "Ihbus" and insert in place thereof --IHbus--.

Column 7, line 33, delete "Ihbus" and insert in place thereof --IHbus--.

Column 7, line 36, delete "millions users" and insert in place thereof --millions of users--.

Column 7, line 39, delete "referring an" and insert in place thereof --referring to an--.

UNITED STATES PATENT AND TRADEMARK OFFICE
CERTIFICATE OF CORRECTION

| | |
|---|---|
| PATENT NO. | : 6,868,295 B2 |
| APPLICATION NO. | : 09/794684 |
| DATED | : March 15, 2005 |
| INVENTOR(S) | : Geng Huang |

It is certified that error appears in the above-identified patent and that said Letters Patent is hereby corrected as shown below:

Column 8, line 54, delete "if program" and insert in place thereof --If program--.

Column 9, line 21, delete "i.e. programming" and insert in place thereof --i.e., programming--.

Column 10, Table 12, delete "8 x 5 =" and insert in place thereof --8 x 5 = 40 bits--.

Column 10, Table 12, delete "40 Bits,".

Column 11, Table 13, delete "8 x 5 =" and insert in place thereof --8 x 5 = 40 bits--.

Column 11, Table 13, delete "40 Bits,".

Column 12, Table 17, delete "32 bit".

Column 12, Table 17, delete "8 x 4 =" and insert in place thereof --8 x 4 = 32 bits--.

UNITED STATES PATENT AND TRADEMARK OFFICE
CERTIFICATE OF CORRECTION

PATENT NO. : 6,868,295 B2
APPLICATION NO. : 09/794684
DATED : March 15, 2005
INVENTOR(S) : Geng Huang It is certified that error appears in the above-identified patent and that said Letters Patent is hereby corrected as shown below:

Column 13, line 36, delete "Ihbus" and insert in place thereof --IHbus--.

Signed and Sealed this

Fifteenth Day of April, 2008

JON W. DUDAS
*Director of the United States Patent and Trademark Office*